United States Patent
Miura

(10) Patent No.: US 6,840,201 B2
(45) Date of Patent: Jan. 11, 2005

(54) VARIABLE VALVE TIMING CONTROL APPARATUS AND METHOD FOR AN INTERNAL COMBUSTION ENGINE

(75) Inventor: Hajime Miura, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/384,632

(22) Filed: Mar. 11, 2003

(65) Prior Publication Data

US 2003/0172888 A1 Sep. 18, 2003

(30) Foreign Application Priority Data

Mar. 15, 2002 (JP) ........................................ 2002-071226

(51) Int. Cl.[7] ................................................. F01L 1/34
(52) U.S. Cl. ............................. 123/90.15; 123/90.17; 123/348
(58) Field of Search ........................... 123/90.15, 90.17, 123/348, 90.27, 90.31, 347, 685, 686, 90.16; 60/274, 276, 284, 285

(56) References Cited

U.S. PATENT DOCUMENTS

| 5,398,502 A | | 3/1995 | Watanabe | |
| 5,924,395 A | * | 7/1999 | Moriya et al. | ............ 123/90.15 |
| 6,408,806 B2 | * | 6/2002 | Sugiyama et al. | ........ 123/90.15 |
| 6,494,173 B2 | * | 12/2002 | Takahashi et al. | ........ 123/90.15 |
| 6,502,535 B2 | * | 1/2003 | Nakamura | ................ 123/90.15 |
| 6,530,351 B2 | * | 3/2003 | Mikame | ................... 123/90.15 |

FOREIGN PATENT DOCUMENTS

| EP | 0 735 246 | 10/1996 |
| EP | 0 826 870 | 3/1998 |
| EP | 1 164 259 | 12/2001 |
| EP | 1 178 199 | 2/2002 |
| EP | 1 186 752 | 3/2002 |
| JP | 2000-18056 | 1/2000 |

* cited by examiner

*Primary Examiner*—Thomas Denion
*Assistant Examiner*—Ching Chang
(74) *Attorney, Agent, or Firm*—Foley & Lardner LLP

(57) ABSTRACT

A variable valve timing control apparatus is provided which comprises an operation angle control mechanism capable of varying an intake operation angle, a phase control mechanism capable of varying an intake maximum lift phase, and a control unit that controls the operation angle control mechanism and the phase control mechanism in accordance with an engine operating condition, wherein the control unit has an engine temperature estimating section that estimates an engine temperature and controls the intake operation angle so that when the engine is operating in an extremely low-load range including idling, the intake operation angle when an engine temperature is extremely low is set larger than that when the engine is cold, the extremely low-engine temperature being lower than the engine temperature when the engine is cold. A method of controlling a variable valve timing of an internal combustion engine is also provided.

29 Claims, 10 Drawing Sheets

FIG.8

| OPERATING CONDITION | | VALVE LIFT CHARACTERISTICS |
|---|---|---|
| PARTIAL LOAD | (a1,a2) IDLE | WHEN ENGINE IS COLD<br>LIFT AND OPERATION : MINIMUM ANGLE<br>PHASE : MAXIMUM RETARD<br>AFTER WARM-UP<br>LIFT AND OPERATION : MINIMUM ANGLE<br>PHASE : RETARD<br>![curves at TDC-BDC showing WHEN ENGINE IS COLD (a1), AFTER WARM-UP (a2), P2, P1] |
| | (b) LOW LOAD | LIFT AND OPERATION : MINIMUM-TO-SMALL ANGLE<br>PHASE : ADVANCE<br>![curve P4 between TDC and BDC] |
| | (c) MEDIUM LOAD | LIFT AND OPERATION : SMALL ANGLE<br>PHASE : MAXIMUM ADVANCE<br>![curve P5 between TDC and BDC] |
| FULL-THROTTLE | (d) LOW SPEED | LIFT AND OPERATION : SMALL-TO-MEDIUM ANGLE<br>PHASE : MAXIMUM RETARD-TO-ADVANCE<br>![curve P3 between TDC and BDC] |
| | (e) MEDIUM SPEED | LIFT AND OPERATION : MEDIUM ANGLE<br>PHASE : MAXIMUM RETARD-TO-ADVANCE<br>![curve P3 between TDC and BDC] |
| | (f) HIGH SPEED | LIFT AND OPERATION : LARGE ANGLE<br>PHASE : MAXIMUM RETARD-TO-ADVANCE<br>![curve P3 between TDC and BDC] |

VARIABLE VALVE TIMING CONTROL APPARATUS AND METHOD FOR AN INTERNAL COMBUSTION ENGINE

BACKGROUND OF THE INVENTION

The present invention relates to a variable valve timing control apparatus for an internal combustion engine which includes both of an operation angle control mechanism capable of varying an operation angle of an intake valve (hereinafter referred to as intake operation angle) and a phase control mechanism capable of varying a maximum lift phase of an intake valve (hereinafter referred to as intake maximum lift phase). The present invention further relates to a method of controlling a variable valve timing of an internal combustion engine.

For the purpose of improving the output and the fuel consumption of an internal combustion engine and reducing the exhaust emission, various variable valve timing control apparatuses for varying the opening and closing characteristics (valve lift characteristics) of intake and exhaust valves have heretofore been proposed. For example, a variable valve timing control apparatus that includes a valve lift control mechanism capable of varying a valve lift and an operation angle of an intake valve in two stages and a phase control mechanism capable of varying a maximum lift phase of an intake valve continuously are used jointly is disclosed in Japanese Patent Provisional Publication No. 2000-18056.

SUMMARY OF THE INVENTION

In such a variable valve timing control apparatus, it is desired to make smaller the intake operation angle when the engine is operating in an extremely low-load range including idling with a view to improving the fuel consumption and reducing the exhaust emission. However, at extremely low temperature, i.e., in case the engine temperature falls beyond −20° C. in a cold district, etc., the friction of the engine becomes extremely high mainly due to an increase of the viscosity of engine oil. Accordingly, if the intake operation angle is made smaller as described when the engine is to operate in the extremely low-load range and at extremely low-engine temperature, it cannot be obtained an engine torque that is sufficiently large enough for the engine to start against the above-described engine friction, thus possibly lowering the engine startability. The present invention has been made with a view to solving such a problem.

To achieve the above object, there is provided according to an aspect of the present invention a variable valve timing control apparatus for an internal combustion engine comprising an operation angle control mechanism capable of varying an intake operation angle of an intake valve, a phase control mechanism capable of varying an intake maximum lift phase of the intake valve, and a control unit that controls the operation angle control mechanism and the phase control mechanism in accordance with an engine operating condition, wherein the control unit has an engine temperature estimating section that estimates an engine temperature and controls the operation angle control mechanism so that when the engine is operating in an extremely low-load range including idling, the intake operation angle when an engine temperature is extremely low is set larger than that when the engine is cold, the extremely low-engine temperature being lower than the engine temperature when the engine is cold.

According to another aspect of the present invention, there is provided a method of controlling a variable valve timing of an internal combustion engine, the engine having a variable valve timing control apparatus that includes an operation angle control mechanism capable of varying an intake operation angle of an intake valve, a phase control mechanism capable of varying an intake maximum lift phase of the intake valve, and a control unit that controls the operation angle control mechanism and the phase control mechanism in accordance with an engine operating condition, the control unit having an engine temperature estimating section that estimates an engine temperature, the method comprising controlling the operation angle control mechanism so that when the engine is operating in an extremely low-load range including idling, the intake operation angle when an engine temperature is extremely low is set larger than that when the engine is cold, the extremely low-engine temperature being lower than the engine temperature when the engine is cold.

BRIEF DESCRIPTION OF THE DRAWINGS

FIG. 8 illustrates intake valve lift characteristics when the engine is under various operating conditions;

DESCRIPTION OF THE PREFERRED EMBODIMENT

Figure 1:
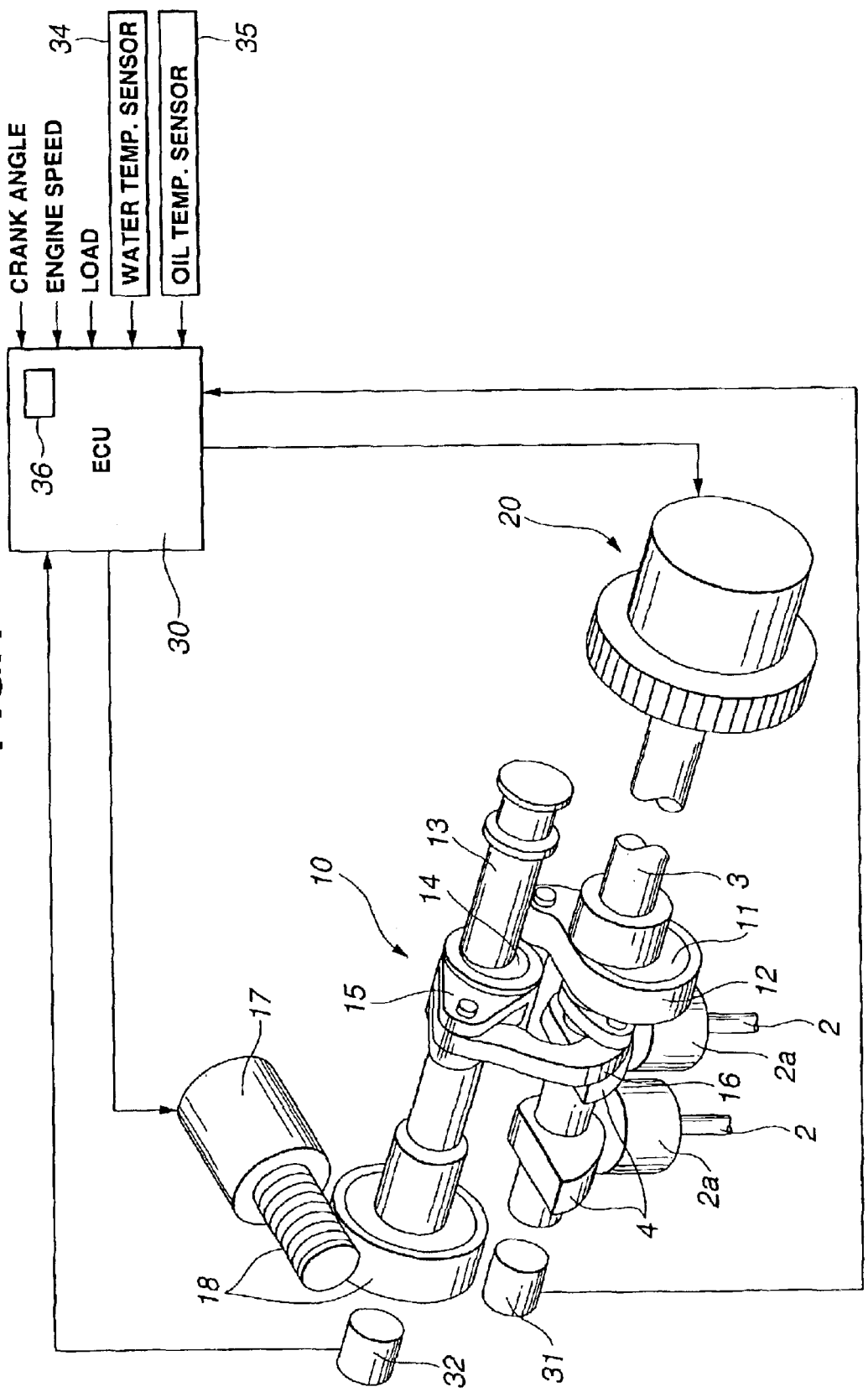
FIG. 1 is a schematic perspective view of a variable valve timing control apparatus according to an embodiment of the present invention.

Referring first to FIG. 1, each cylinder (not shown) is provided with a pair of intake valves 2. Above intake valves 2 is disposed hollow intake drive shaft 3 that extends in the direction along which cylinders (not shown) are arranged. Rotatably installed on intake drive shaft 3 are oscillation cams 4 that are drivingly connected to each other by a sleeve (no numeral) so as to oscillate or pivot together and abuttingly engaged with valve lifters 2a so as to drive intake valves 2, respectively.

Between intake drive shaft 3 and one oscillation cam 4 is disposed operation angle control mechanism 10 for continuously varying the operation angle and valve lift of intake valves 2. To an end portion of intake drive shaft 3 is provided phase control mechanism 20 that is capable of continuously varying an intake maximum lift phase that is a phase of intake valve 2 when the lift of intake valve 2 is maximum, by varying the phase of intake drive shaft 3 relative to a crankshaft (not shown).

Figure 2:
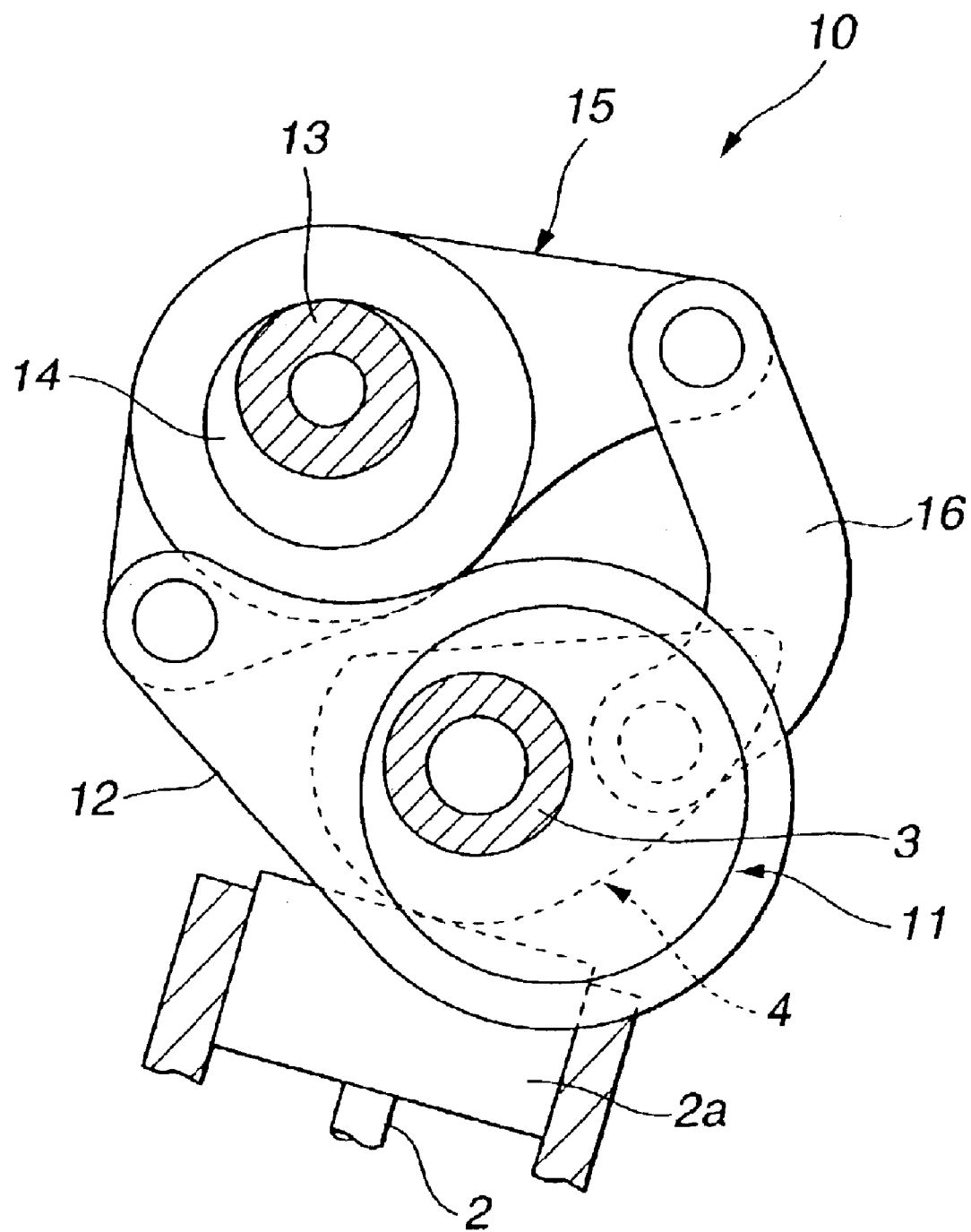
FIG. 2 is a sectional view of an operation angle control mechanism of the variable valve timing control apparatus of FIG. 1.

As shown in FIGS. 1 and 2, operation angle control mechanism 10 includes circular drive cam 11 eccentrically and fixedly mounted on intake drive shaft 3, pivotal link 12 pivotally mounted on drive cam 11, control shaft 13 extending in parallel with intake drive shaft 3 and in the direction in which the cylinders (not shown) are arranged, circular control cam 14 eccentrically and fixedly provided to control shaft 13, rocker arm 15 pivotally mounted on control cam 14 and having an end portion pivotally connected to a protruded arm portion of pivotal link 12, and connecting link 16 having an upper end portion pivotally connected to another end portion of rocker arm 15 and a lower end portion pivotally connected to one oscillation cam 4. Control shaft 13 is driven to rotate within a predetermined control range by means of electric actuator 17 and by way of gear unit 18.

With the above-described structure, when intake drive shaft 3 is rotated in timed relation to the crankshaft, drive cam 11 causes pivotal link 12 to move up and down. Movement of pivotal link 12 causes rocker arm 15 to pivot about the axis of control cam 14. Oscillation cams 4 are caused to oscillate by way of connecting link 16, thus driving intake valves 2 to open and close. Further, by varying the rotational or angular position of control shaft 13, the axis of control cam 14 that is the pivotal axis of rocker arm 15 is varied, thus causing the position of oscillation cams 4 to be varied. This enables the intake operation angle and valve lift to be varied continuously with the intake maximum lift phase being maintained nearly constant.

Such operation angle control mechanism 10 has a good durability and reliability in operation since the connecting portions of the constituent parts such as the bearing portions of drive cam 11 and control cam 14 are structured so as to be in surface-to-surface contact with each other and therefore lubrication thereof can be attained with ease. Further, since oscillation cam 4 that drives intake valve 2 is disposed concentrically with intake drive shaft 3, operation angle control mechanism 10 can be more accurate in control and more compact in size so as to be installed on the engine more easily as compared with the mechanism where the oscillation cam is installed on a shaft different from intake drive shaft 3. Particularly, operation angle control mechanism 10 can be applied to the direct drive type valve operating system without requiring a large change of layout. Further, since a biasing means such as return springs is not necessitated, the friction of the valve operating mechanism can be held low.

ECU (Engine control Unit) 30 executes the following variable control of the operation angle and maximum lift phase of intake valves 2 in addition to a general engine control such as a fuel injection control and an ignition timing control based on the angular positions of intake drive shaft 3 and control shaft 13 that are detected by angle detecting sensor 31 and further on the engine operating conditions such as crank angle, engine speed, load and engine temperature that are detected or estimated by various sensors or the like. Further, ECU 30 includes engine temperature estimating means 36 that estimates the engine temperature (oil/water temperature) based upon at least one of the cooling water temperature detected by water temperature sensor 34 and the oil temperature detected by oil temperature sensor 35. Based on the engine temperature, ECU 30 can determine whether the engine is in a warm-up condition, i.e., whether the engine temperature is extremely low or whether the engine is cold or after warm-up, accurately.

Figure 3:
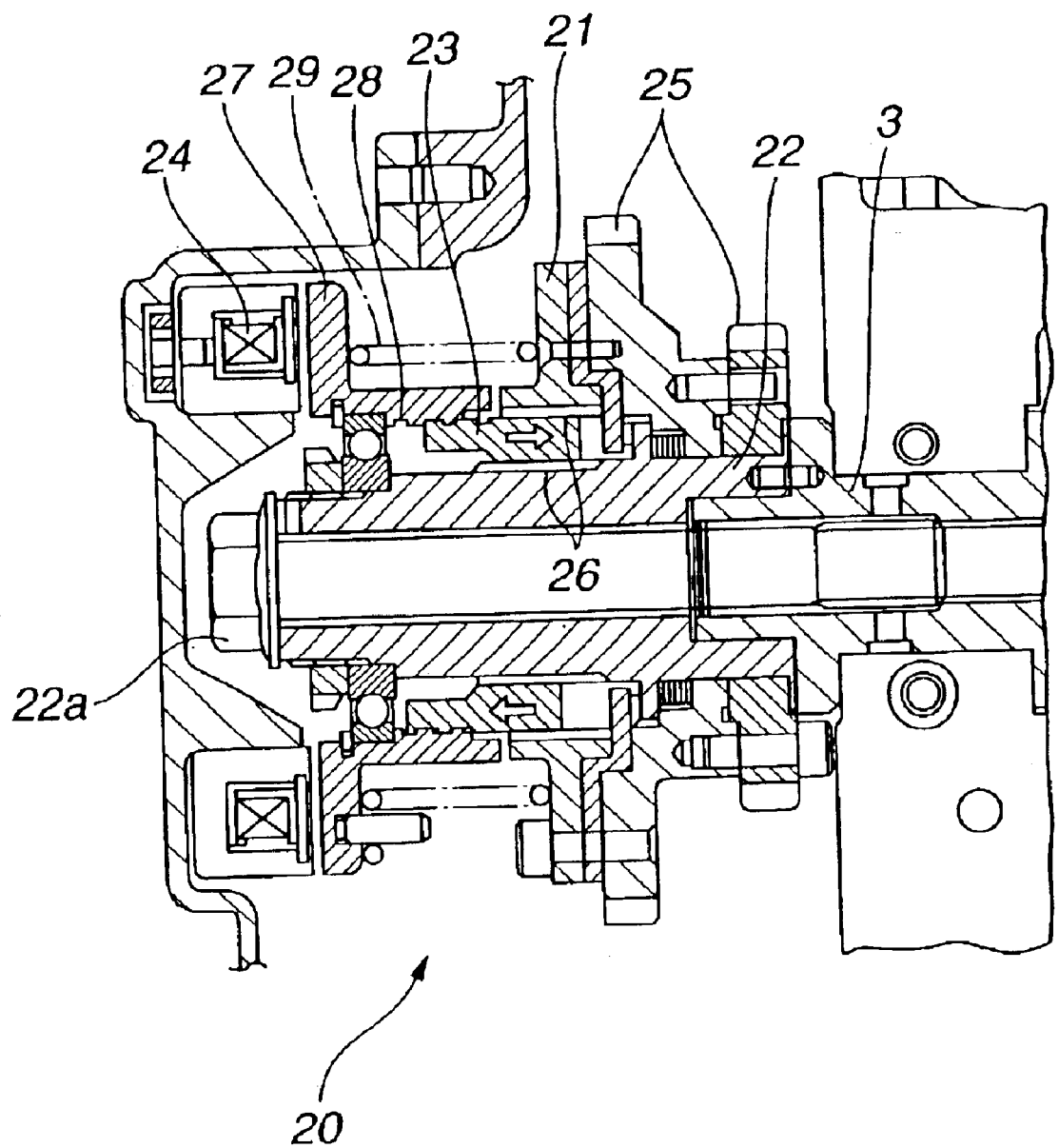
FIG. 3 is an enlarged sectional view of a phase control mechanism of the variable valve timing control apparatus of FIG. 1.

FIG. 3 shows electric phase control mechanism 20. Phase control mechanism 20 includes first rotor 21 fixedly attached to cam sprocket 25 that rotates in timed relation to the crankshaft, second rotor 22 fixedly attached to an end of intake drive shaft 3 to rotate together with intake drive shaft 3, and intermediate gear 23 meshed with the inner circumferential surface of first rotor 21 and the outer circumferential surface of second rotor 22 by means of helical splines 26. To intermediate gear 23 is connected drum 27 by way of three-start threads 28. Between drum 27 and intermediate gear 23 is disposed coil spring 29. Intermediate gear 23 is urged by coil spring 29 in the direction to retard (in the left-hand direction in FIG. 3) and is caused to move in the direction to advance (in the right-hand direction in FIG. 3) by way of drum 27 and three-start threads 28 when a voltage is applied to electromagnetic retarder 24 to produce a magnetic force. Depending upon the axial position of intermediate gear 23, the relative phase of rotors 21, 22 is varied thereby varying the phase of intake drive shaft 3 relative to the crankshaft. Above-described electromagnetic retarder 24 is controlled depending upon a control signal from ECU 30.

Figure 4:
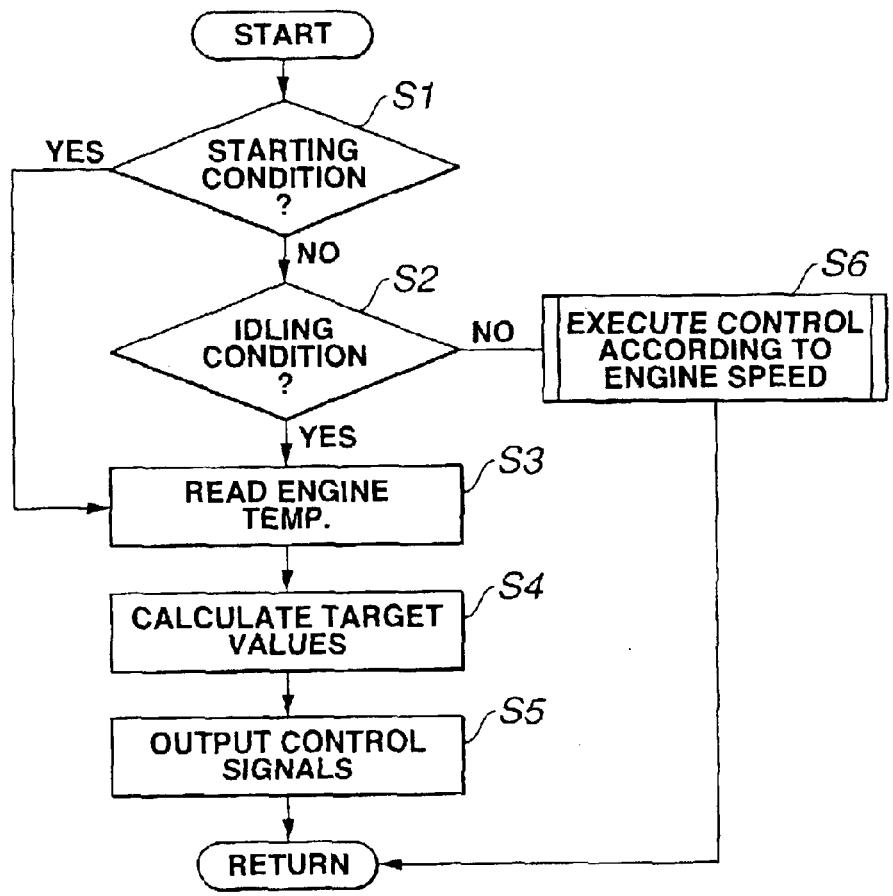
FIG. 4 is a flowchart of a control routine of determining and controlling the intake operation angle and intake maximum lift phase.

FIG. 4 shows a flowchart of a control routine for determination and control of the intake operation angle and intake maximum lift phase at start of the engine and when the engine is operating in an extremely low-load range, which constitutes an important part of this embodiment. The control routine is executed by ECU 30. When it is determined in step S1 that the engine is in a starting condition or it is determined in step S2 that the engine is operating in an extremely low-load range including idling, the program proceeds to step S3 where the engine temperature that is estimated by engine temperature estimating means 36 is read. In the memory of ECU 30 are stored tables or maps corresponding to (a) of FIG. 5 and (b) or (c) of FIG. 6. In step S4, the target values of the intake operation angle and the intake maximum lift phase are calculated by reference to those tables or maps. In step S5, control signals corresponding to those target values are outputted to electric actuator 17 of operation angle control mechanism 10 and electromagnetic retarder 24 of phase control mechanism 20. According to those control signals, the intake operation angle and intake maximum lift phase are controlled independently. When the determination in step S2 is negative, the program proceeds to step S6 where determination and control of the intake operation angle and intake maximum lift phase according to the engine speed and engine load is executed by another control routine that is not shown.

Figure 5:
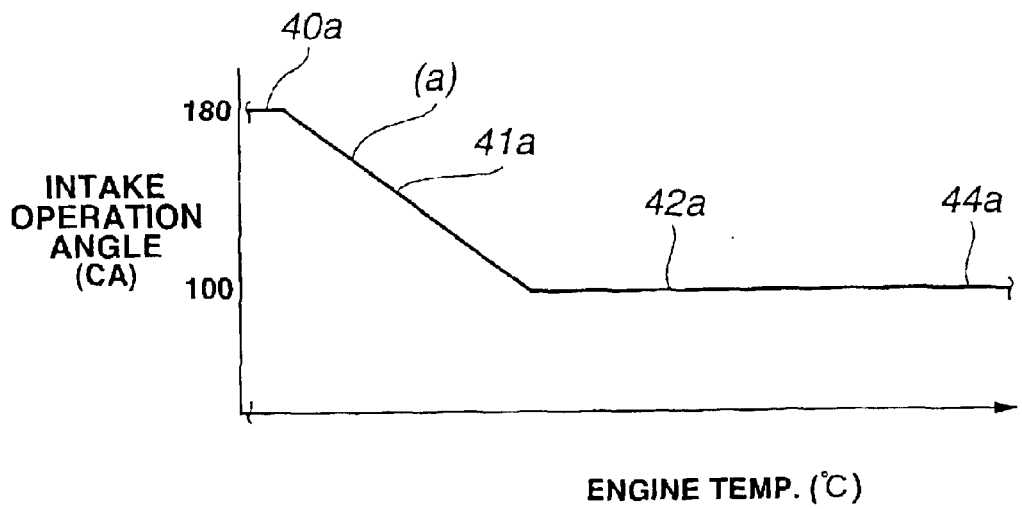
FIG. 5 is a diagram showing an intake operation angle in relation to engine temperature when the engine is operating in an extremely low-load range.
Figure 6:
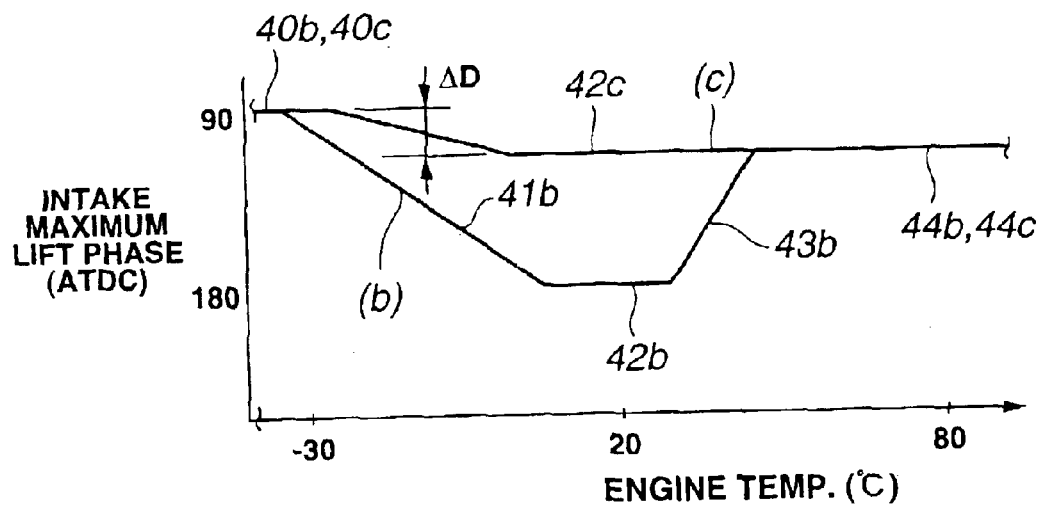
FIG. 6 is a diagram showing an intake maximum lift phase in relation to engine temperature when the engine is operating in an extremely low-load range.
Figure 7:
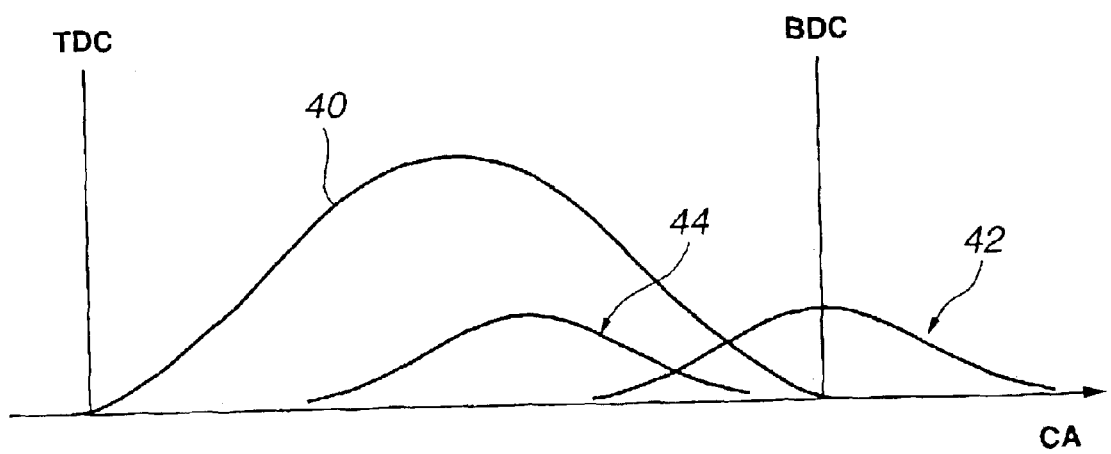
FIG. 7 is a diagram showing various valve lift characteristics when the engine is operating in an extremely low-load range.

FIGS. 5 to 7 show intake valve lift characteristics with relation to the engine temperature when the engine is in the above-described starting condition or the engine is operating in the extremely low-load range including idling. Indicated by (a) of FIG. 5 are the intake operation angle characteristics, and indicated by (b) of FIG. 6 are the intake maximum lift phase characteristics. In the meantime, the phrase "when the engine is cold" is herein used to indicate that the engine is of the normal temperature before warm-up and typically the engine temperature is 20° C. The phrase "when the engine temperature is extremely low" is herein used to indicate that the temperature of the engine in cold districts or the like is lower than that normally resulting when the engine is cold and typically −20° C. or lower.

When the engine temperature is extremely low, the viscosity of engine oil that serves as lubricant becomes higher as compared with that when the engine is cold and therefore the friction of the engine becomes larger. This results in the necessity of making the engine produce a larger torque for maintaining at least idle engine speed against the friction. Thus, in this embodiment, when the engine temperature is extremely low, the intake operation angle 40a is set at about 180° CA (crank angle) and the intake maximum lift phase 40b is set at about 90° ATDC (after top dead center). Namely, the intake valve opening timing (IVO) of intake valve characteristics 40 (refer to FIG. 7) is set at a point adjacent TDC and the intake valve closing timing (IVC) is set at a point adjacent BDC. This enables intake valve 2 to open in proper quantities on intake stroke, i.e., no overlap and no minus overlap are caused, thus enabling the engine to produce a sufficient torque for maintaining idle engine speed against the above-described friction. Accordingly, it becomes possible to obtain a good engine startability and a rapid warm-up operation even when the engine temperature is extremely low.

When the engine is cold, intake operation angle 42a is set at a minimum operation angle, i.e., at a value ranging from about 80° to 100° CA and preferably 90° CA, and intake maximum lift phase 42b is set at a maximumly retarded phase, i.e., at 180° ATDC, namely, set at a point adjacent BDC, and the intake valve opening timing (IVO) of intake valve lift characteristics 42 is largely retarded than TDC to enlarge the retard limits of the ignition timing thereby accelerating a rise of exhaust temperature and shortening the time for catalyst temperature rise for thereby improving the exhaust emission. Further, by minimizing the intake operation angle, the friction of the valve operating system can be kept minimum while enhancing the gas flow thereby accelerating atomization of fuel.

After warm-up, intake operating angle 44a is kept minimum similarly to the time when the engine is cold, and intake maximum lift phase 44b is advanced than that when the engine is cold thereby decreasing the pumping loss and improving the fuel consumption.

At the transition from the time when the engine temperature is extremely low to the time when the engine is cold, intake operation angle 41a is made smaller gradually and intake maximum lift phase 41b is retarded gradually as the engine temperature rises. Further, at the transition from the time when the engine is cold to the time after warm-up, intake maximum lift phase 43b is advanced gradually as the engine temperature rises. Accordingly, in case, for example, the engine is started when the engine temperature is extremely low and idling of the engine is continued until warm-up is completed, it becomes possible to vary the intake operation angle and intake maximum lift phase smoothly to those that can effect such characteristics that are advantageous from the exhaust emission and the fuel consumption as the engine temperature rises, while attaining a good engine startability.

The above-described setting example of the intake maximum lift phase represented by (b) of FIG. 6 is suited for use with electric phase control mechanism 20 that has a good responsiveness and can set the variable amount sufficiently large. In contrast to this, the setting example of the intake maximum lift phase represented by (c) of FIG. 6 is suited for use with a hydraulic drive type phase control mechanism that is inferior in the responsiveness and the variable amount to the above-described electric type but is superior in the cost.

The setting (c) of FIG. 6 differs from the setting (b) of FIG. 6 in that the set value 42c when the engine is cold is made equal to the set value 44c after warm-up. The set values 40c, 44c when the engine temperature is extremely low and after warm-up are equal to the set values 40b, 44b of (b) of FIG. 6. According to the setting (c) of FIG. 6, it is unnecessary to vary the intake maximum lift phase at the transition from the time when the engine is cold to the time after warm-up and a variation ΔD of the intake maximum lift phase at the transition from the time when the engine temperature is extremely low to the time when the engine is cold can be small. For this reason, a variation of the intake maximum lift phase can be smaller as compared with the setting (b) of FIG. 6 though improvement of the exhaust emission by considerable retardation of the intake maximum lift phase when the engine is cold cannot be attained, thus making it possible to attain, for example, a good startability when the engine temperature is extremely low and vary the intake maximum lift phase suitably according to increase of the engine temperature.

FIG. 8 shows an example of setting of the intake operation angle and intake maximum lift phase at various engine operating conditions. In the meantime, intake maximum lift phases P1 to P5 that will be described later have a relation of P1<P2<P3<P4<P5 when the advance side is regarded as positive.

Firstly, the valve lift characteristics after warm-up will be described. In the extremely low-load range (a1) including idling, the intake maximum lift phase is set at a predetermined retarded phase P2 and the intake operation angle is set at a minimum operation angle thereby setting the intake valve opening timing (IVO) at a point after TDC and the intake valve closing timing (IVC) at a point adjacent BDC. By this, the remaining gas is reduced and the upper surface of the piston is not exposed to the intake vacuum from TDC so that the intake valve opens after the piston moves a certain amount from TDC and vacuum is produced inside the cylinder, thus making it possible to reduce the pumping loss. Further, since the intake operation angle is minimized, the friction is reduced and the gas flow is enhanced to accelerate atomization of fuel. As a result, it becomes possible to improve the fuel consumption and exhaust efficiency. The above-described minimum operation angle ranges, for example, from 80° to 90° CA and the above-described retarded phase P2 is a value on the retard side of at least 90° ATDC (after top dead center).

In the medium-load range (c), the intake vale opening timing is set at a point before TDC for the purpose of reducing the pumping loss mainly by the effect of increase of the remaining gas and improving the combustion by the effect of the high-temperature remaining gas, and at the same time the intake valve closing timing (IVC) is set at a point before BDC for the purpose of reducing the pumping loss by mainly reducing the intake air amount (charging efficiency). Thus, the operation angle is set at a predetermined small operation angle larger than the above-described minimum operation angle and the intake maximum lift phase is set at a most advanced phase P5.

In the low-load range (b) where the intake air amount is smaller than that in the above-described medium-load range, the intake operation angle is set at a value between the above-described minimum operation angle and the small operation angle mainly for the purpose of improving the combustion and reducing the remaining gas, and at the same time the intake maximum lift phase is set at a predetermined advanced phase P4. By this, it becomes possible to reduce the pumping loss by the effect of increase of the effective compression ratio thereby improving the fuel consumption. The above-described advanced phase P4 is the value on the retard side of the above-described most advanced phase P5 and on the advance side of 90° ATDC (after top dead center).

In the full-throttle range (d) to (f), mainly for the purpose of improving the charging efficiency, the intake maximum lift phase is set at or adjacent a predetermined intermediate phase P3 and the intake operation angle is increased with increase of the engine speed. For example, in the full-throttle and low-speed range (d), the intake valve opening timing (IVO) is set nearly at TDC and the intake valve closing timing (IVC) is set at a point after BDC. The intermediate phase P3 is, for example, 90° ATDC (after top dead center).

On the other hand, at an engine operating condition in the extremely low-load range (a1) such as starting or idling when the engine is cold, i.e., when the engine temperature is lower than a predetermined value, it is hard to obtain sufficient warm-up of catalyst so that for the purpose of improving the combustion and thereby purifying the exhaust emission and raising the exhaust temperature the intake operation angle is set minimum and the intake maximum lift phase is set at a most retarded phase P1 thereby retarding the intake valve opening timing (IVO) than TDC considerably. By such setting, the gas flow is enhanced to accelerate atomization of the fuel and retardation of the intake valve opening timing (IVO) causes the intake valve to open after the vacuum within the cylinder has been developed sufficiently, thus allowing the gas flow to be enhanced further at the time of opening of the intake valve.

In the meantime, though pot shown, in the low to medium load range when the engine is cold, there is a possibility of the combustion being deteriorated if the lift characteristics are set equal to those (b), (d) after warm-up. Thus, it is necessitated, for example, to set the lift characteristics nearly equal to those (d) in the low-speed and full-throttle range.

In the meantime, differing from the setting (a2) of FIG. 8, the operation angle of the intake valve in the extremely low-load range, e.g., at start can be set smaller when the engine is cold than after warm-up. In this instance, since the operation angle becomes smaller at cold engine start (i.e., start when the engine is cold) than after warm-up, the gas flow is enhanced and the combustion is improved. On the other hand, since the operation angle becomes relatively larger at hot engine start (i.e., start when the engine is hot) as compared with that at cold engine start, it becomes possible to suppress the intake resistance and improve the fuel consumption.

Figure 9:
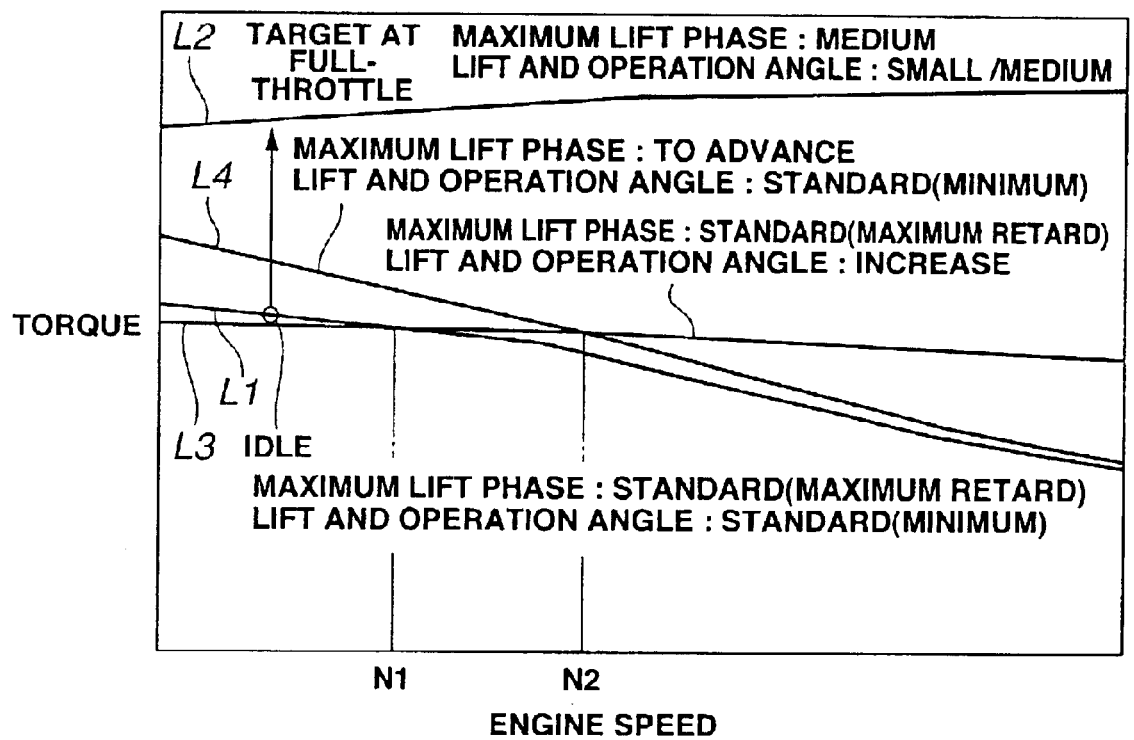
FIG. 9 is a diagram showing the valve lift characteristics upon acceleration from idling of cold engine.
Figure 10:
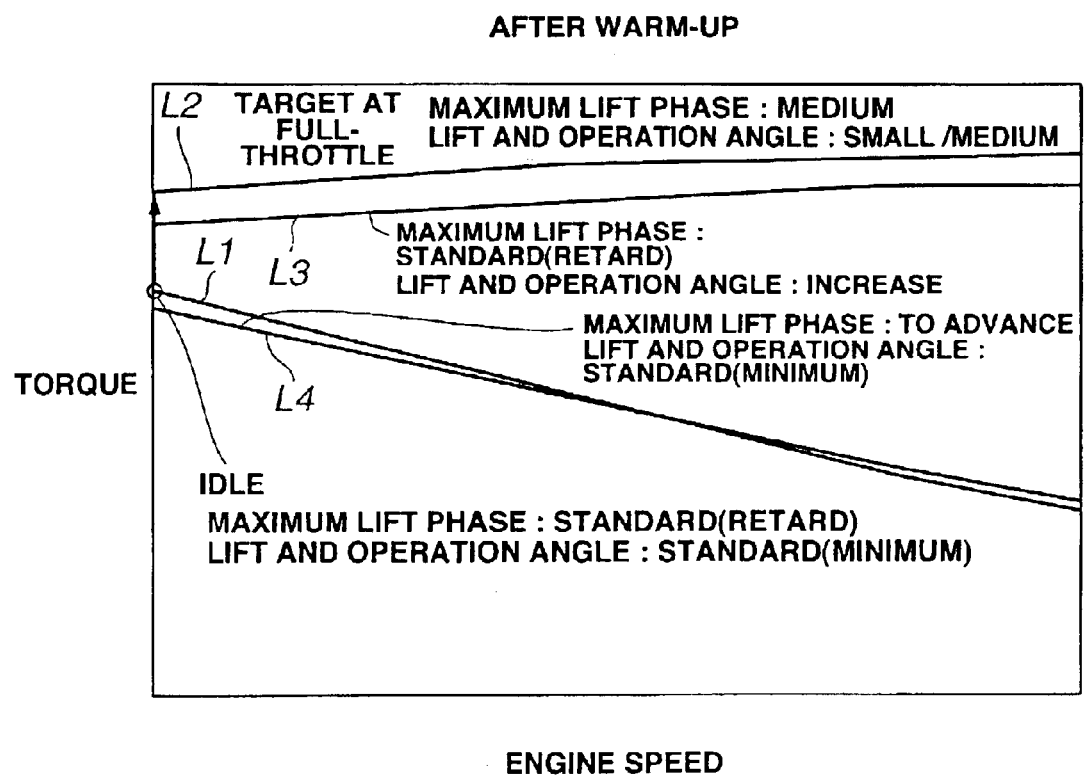
FIG. 10 is a diagram showing the valve lift characteristics upon acceleration from idling after warm-up.
Figure 11:
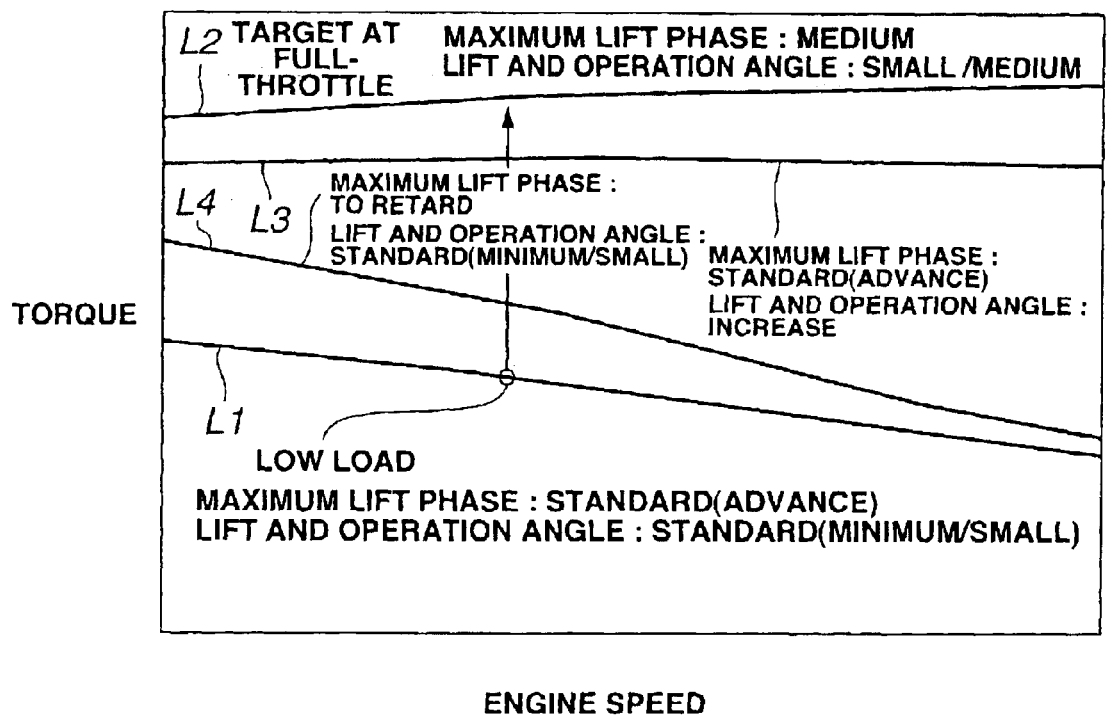
FIG. 11 is a diagram showing the valve lift characteristics upon acceleration from idling after warm-up.

Then, referring to FIGS. 9 to 11, description will be made as to the examination on the case where acceleration is made from various operating conditions. In the meantime, L1 indicates the standard characteristics corresponding to the standard setting of the intake operation angle and the intake maximum lift phase under the operating condition before acceleration. Further, L2 indicates the target characteristics corresponding to the target operation angle and the target phase, L3 indicates the characteristics under the condition where only the intake operation angle is varied by a predetermined amount toward the target operation angle with respect to the standard characteristics L1, and L4 indicates the characteristics under the condition where on the intake maximum lift phase is varied by a predetermined amount toward the target phase with respect to the standard characteristics L1.

Firstly, referring to FIG. 9, consideration will be made with respect to acceleration from an extremely low-load range when the engine is cold (cold engine idling condition). Under the cold engine idling condition, if only the intake operation angle is increased, there is a possibility of the torque being decreased temporarily for some reason such as one that the intake valve closing timing (IVC) is extremely delayed. For example, since in an engine speed range lower than the first engine speed N1 the torque of the characteristics L3 after the operation angle is increased is lower than that of the standard torque L1, the torque will be decreased temporarily if only the intake operation angle is varied.

On the other hand, at the time of acceleration from such an extremely low-load range, advance of only the intake maximum lift phase causes the torque to increase assuredly. Accordingly, at acceleration from such an extremely low-load and extremely low-engine speed range, advance of the intake maximum lift phase by means of phase control mechanism 20 is carried out by priority. Namely, only phase control mechanism 20 is driven or phase control mechanism 20 is controlled so that the amount of variation of the intake maximum lift phase by means of phase control mechanism 20 is sufficiently larger than the amount of variation of operation angle control mechanism 10. By this, the torque in transition of acceleration trends assuredly toward increase, thus making it possible to avoid reduction of the torque in transition assuredly.

In the meantime, the standard setting (minimum operation angle and most advanced phase) L1 at cold engine idling (i.e., idling when the engine is cold) is used in the engine speed range higher in engine speed than the extremely low-engine speed range mainly for the purpose of improving the combustion. However, as the engine speed becomes higher, the suction time decreases if the intake operation angle is the same. Thus, only advance of the intake maximum lift phase cannot increase the full-throttle torque effectively. Accordingly, in the extremely low-engine speed range (e.g., the engine speed range lower than the engine speed N2 at which the characteristics L3 under the condition where the intake operation angle is increased and the characteristics L4 under the condition where the intake maximum lift phase is advanced are reversed in torque), the intake maximum lift phase is advanced by priority as described above, and in the low-engine speed range (e.g., the engine speed range exceeding the second engine speed N2) the intake operation angle is increased by priority, thereby making it possible to increase the engine torque most efficiently.

Then, by reference to FIG. 10, consideration will be made with respect to acceleration from the extremely low-load range after warm-up. In the extremely low-load range after warm-up, mainly for the purpose of suppressing the intake resistance thereby improving the fuel consumption, the intake maximum lift phase is set at the retarded phase P2 (refer to FIG. 8) that is for use after warm-up and that is advanced than the most retarded phase P1. Namely, in order to make higher the effective compression ratio thereby improving the combustion, the intake valve closing timing (IVC) is advanced than that when the engine is cold. Accordingly, if only the intake maximum lift phase is advanced, the effective compression ratio and the charging efficiency are lowered, possibly causing such a case where the torque cannot be increased effectively. Thus, at the time of acceleration from the extremely low-load range after warm-up, the intake operation angle is increased by priority thereby making it possible to increase the torque efficiently.

Thus, even in the case of acceleration from the same load range, one of operation angle control mechanism 10 and phase control mechanism 20 is driven by priority based on the engine speed or engine temperature (cold engine or hot engine) thereby making it possible to increase the torque efficiently and improve the drivability of the vehicle.

Then, by reference to FIG. 11, consideration will be made with respect to acceleration from the low-load range after warm-up. At acceleration from the low-load range, as is apparent that in FIG. 11 both of the characteristics L3 and L4 are higher in torque than the standard characteristics L1, the torque can be increased by either increasing the operation angle or retarding the phase. However, as is apparent that in FIG. 11 the characteristics L3 under the condition where the operation angle is increased is always higher in torque than the characteristics L4 under the condition where the phase is retarded, the torque can be increased efficiently by increasing the intake operation angle by means of operation angle control mechanism 10 prior to retardation of the intake maximum lift phase 20 by means of phase control mechanism 20.

In the meantime, though not shown, at the time of acceleration from the medium-load range such as (c) of FIG. 8, it is preferable to carry out retardation of the intake maximum lift phase by means of phase control mechanism 20 by priority irrespective of the engine speed since if increase of the operation angle is carried out by priority the intake valve opening timing (IVO) becomes too earlier to cause a possibility that the intake valve and the piston come very close to each other.

As described above, since phase control mechanism 20 is structured so as to be of the electrically-driven type, it becomes possible to vary the intake maximum lift phase rapidly irrespective of the engine temperature (whether the engine is cold or hot). Namely, as compared with the hydraulic drive that is liable to cause a delay in variation of the phase when the engine is cold, it becomes possible to vary the phase rapidly even when the engine is cold. By this, the intake valve opening timing (IVO) can be retarded largely when the engine that is cold is to be started to enhance the gas flow thereby improving the combustion and the exhaust gas purification. Further, after warm-up, the intake maximum lift phase is advanced a little for the purpose of reducing the intake resistance thereby improving the fuel consumption. By this, both of the purification of the exhaust emission when the engine is cold and the improvement of the fuel consumption after warm-up can consist and be maintained at the high level.

Further, since operation angle control mechanism 10 is of the electrically-driven type, the variable width can be set sufficiently large, e.g., 80° to 280° CA and the intake operation angle can be varied assuredly and rapidly even at cold engine start or at extremely low-engine speed. Namely, by employing such electrically-driven type operation angle control mechanism 10, operation angle control mechanism 10 can be driven by priority even when the engine is operating in a low-engine speed range. Further, the operation angle can be increased rapidly irrespective of the engine temperature (whether the engine is cold or after warm-up). For this reason, as compared with the hydraulically-driven type that is liable to cause a delay of increase of the operation angle when the engine is cold, the minimum operation angle can be set sufficiently small thereby making it possible to effectively enhance the gas flow at cold engine start and improve the combustion, thus making it possible to further purify the exhaust emission.

Since both of control mechanisms 10, 20 are of the electrically-driven type, a control of switching the priority of the both control mechanisms 10, 20 can be done even in transition of acceleration.

In the meantime, in case of the structure where, as in the embodiment, the actual measurement value (actual maximum lift phase) of intake drive shaft 3 relative to the crank angle based on the detection signal from sensor 31 for detecting an angle of intake drive shaft 3, the intake maximum lift phase is detected every one rotation of intake drive shaft 3. On the other hand, in case of the structure where the actual measurement value of the intake operation angle (actual operation angle) is detected based on the detection signal from sensor 32 for detecting an angle of control shaft 13, the interval between detections can be set freely so that the actual operation angle can be detected at an arbitrary timing. Accordingly, by detecting the actual operation angle at the timing at which the actual intake phase is detected, it becomes possible to execute a control of setting the target value of the intake operation angle and the intake maximum lift phase, or the like based on the actual intake phase and the actual operation angle that are detected at the same time, thus making it possible to improve the accuracy in control.

Figure 12:
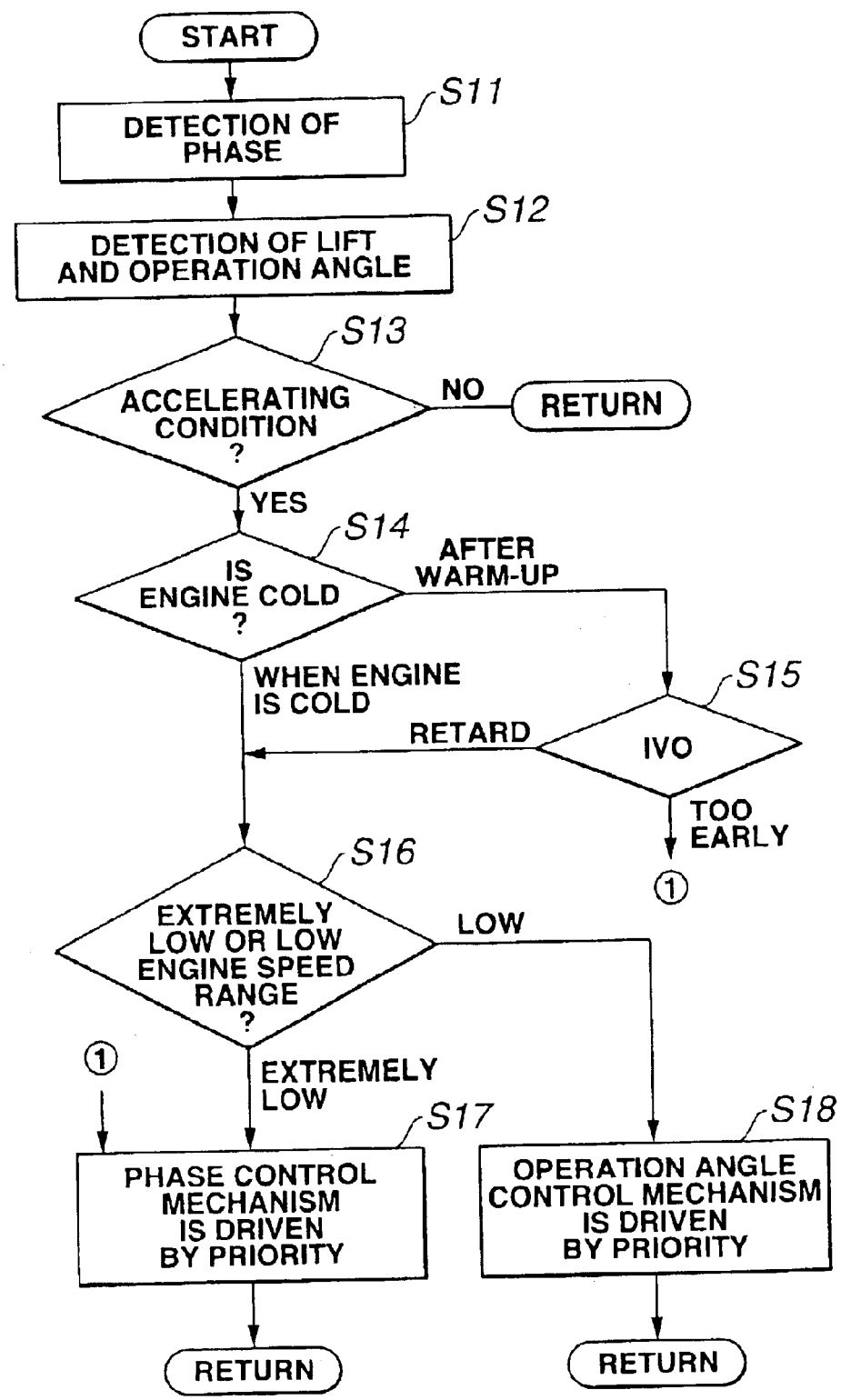
FIG. 12 is a flowchart of a control routine of determining and controlling the priority of the operation angle control mechanism and the phase control mechanism.

The flow of such control will be described with reference to the flowchart of FIG. 12. In step S11, the actual intake phase is detected based on the detection signal from sensor 31 for detecting an angle of intake drive shaft 3. Then, the program proceeds to step S12 where the actual operation angle is detected based on the detection signal of sensor 32 for detecting an angle of control shaft 13. In step S13, it is determined whether the engine is in an accelerating condition. If it is determined in step S13 that the engine is in an accelerating condition, i.e., the answer is Yes, the program proceeds to step S14 where it is determined based on the engine temperature or the like whether the engine is cold or in a condition after warm-up. If the engine is cold, the program proceeds to step S16 where it is determined based on the engine speed whether the engine is operating in an extremely low-engine speed or low-engine speed range. If the engine is operating in an extremely low-engine speed range, the program proceeds to steep S17 where a control of driving phase control mechanism 20 by priority is executed. On the other hand, if the engine is operating in a low-engine speed range, the program proceeds to step S18 where a control of driving operation angle control mechanism 10 by priority is executed.

Further, if it is determined in step S14 that the engine is in a condition after warm-up, the program proceeds to step S15 where it is determined whether the intake valve opening timing (IVO) is excessively early. If the intake valve opening timing (IVO) is excessively early, the program proceeds to step S17 where a control of driving phase control mechanism 20 by priority is executed. If it is determined in step S15 that the intake valve opening timing (IVO) is relatively late, the program proceeds to step S16 where it is determined based on the engine speed which one of control mechanisms 10, 20 is to be driven by priority.

The entire contents of Japanese Patent Applications P2002-71226 (filed Mar. 15, 2002) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. A variable valve timing control apparatus for an internal combustion engine comprising:

an operation angle control mechanism capable of varying an intake operation angle of an intake valve;

a phase control mechanism capable of varying an intake maximum lift phase of the intake valve; and a control unit that controls the operation angle control mechanism and the phase control mechanism in accordance with an engine operating condition;

wherein the control unit has an engine temperature estimating section that estimates an engine temperature and controls the operation angle control mechanism so that when the engine is operating in an extremely low-load range including idling, the intake operation angle when an engine temperature is extremely low is set larger than that when the engine is cold, the extremely low engine temperature being lower than the engine temperature when the engine is cold.

2. A variable valve timing control apparatus according to claim 1, wherein the control unit controls the phase control mechanism so that when the engine is operating in the extremely low-load range, the intake maximum lift phase when the engine is cold is retarded more than that when the engine temperature is extremely low.

3. A variable valve timing control apparatus according to claim 2, wherein the control unit controls the phase control mechanism so that when the engine is operating in the extremely low-load range, the intake maximum lift phase after warm-up is advanced more than that when the engine is cold.

4. A variable valve timing control apparatus according to claim 3, wherein the control unit controls the operation angle control mechanism and the phase control mechanism so that when the engine temperature is extremely low and the engine is operating in the extremely low-load range, the intake operation angle is set at about 180° CA and the intake maximum lift phase is set at about 90° ATDC.

5. A variable valve timing control apparatus according to claim 3, wherein the control unit controls the operation angle control mechanism and the phase control mechanism so that when the engine is cold and is operating in the extremely low-load range, the intake operation angle is set at about 90° CA and the intake maximum lift phase is set at about 180° ATDC.

6. A variable valve timing control apparatus according to claim 3, wherein at acceleration of the engine the control unit drives one of the operation angle control mechanism and the phase control mechanism by priority based on at least one of an engine speed and the engine temperature.

7. A variable valve timing control apparatus according to claim 6, wherein at acceleration from the extremely low-load range when the engine is cold, the control unit drives the phase control mechanism by priority.

8. A variable valve timing control apparatus according to claim 6, wherein at acceleration from the extremely low-load range after warm-up, the control unit drives the operation angle control mechanism by priority.

9. A variable valve timing control apparatus according to claim 6, wherein at acceleration from the extremely low-load range when the engine is cold the control unit drives the phase control mechanism by priority, and at acceleration from the extremely low-load range after warm-up the control unit drives the operation angle control mechanism by priority.

10. A variable valve timing control apparatus according to claim 6, wherein at acceleration from the extremely low-load range when the engine is cold, the control unit drives the phase control mechanism by priority if the engine is operating in an extremely low-engine speed range.

11. A variable valve timing control apparatus according to claim 6, wherein at acceleration from the extremely low-load range when the engine is cold, the control unit drives the operation angle control mechanism by priority if the engine is operating in a low-engine speed range.

12. A variable valve timing control apparatus according to claim 6, wherein when at acceleration from the extremely low-load range when the engine is cold, the control unit drives the phase control mechanism by priority if the engine is operating in an extremely low-engine speed range and drives the operation angle control mechanism by priority if the engine is operating in a low-engine speed range.

13. A variable valve timing control apparatus according to claim 1, wherein at least one of the phase control mechanism and the operation angle control mechanism is of an electrically-driven type.

14. A variable valve timing control apparatus according to claim 1, wherein the control unit controls the operation angle control mechanism so that when the engine is operating in the extremely low-load range, the intake operation angle when the engine is cold is set smaller than that after warm-up.

15. A variable valve timing control apparatus according to claim 1, wherein the operation angle control mechanism comprises an intake drive shaft, an oscillation cam rotatably mounted on the intake drive shaft for driving an intake valve of the engine, a circular drive cam eccentrically and fixedly mounted on the intake drive shaft, a pivotal link pivotally mounted on the drive cam, a control shaft extending in parallel with the intake drive shaft, a circular control cam eccentrically and fixedly provided to the control shaft, a rocker arm pivotally mounted on the control cam and having an end portion pivotally connected to a protruded arm portion of the pivotal link, and a connecting link having an upper end portion pivotally connected to another end portion of the rocker arm and a lower end portion pivotally connected to the oscillation cam.

16. A variable valve timing control apparatus according to claim 15, wherein the control unit comprises:

a section for detecting a rotational angle of the intake drive shaft;

a section for detecting an actual maximum lift phase of the intake valve based on the rotational angle of the intake drive shaft;

a section for detecting a rotational angle of the control shaft;

a section for detecting an actual operation angle of the intake valve based on the rotational angle of the control shaft;

the actual operation angle being detected at the timing at which the actual maximum lift phase is detected; and a section for determining target values of the intake operation angle and the intake maximum lift phase based on the actual maximum lift phase and the actual operation angle.

17. A method of controlling a variable valve timing of an internal combustion engine, the engine having a variable valve timing control apparatus that includes an operation angle control mechanism capable of varying an intake operation angle of an intake valve, a phase control mechanism capable of varying an intake maximum lift phase of the intake valve, and a control unit that controls the operation angle control mechanism and the phase control mechanism in accordance with an engine operating condition, the control unit having an engine temperature estimating section that estimates an engine temperature, the method comprising controlling the operation angle control mechanism so that when the engine is operating in an extremely low-load range including idling, the intake operation angle when an engine temperature is extremely low is set larger than that when the engine is cold, the extremely low engine temperature being lower than the engine temperature when the engine is cold.

18. A method according to claim 17, further comprising controlling the phase control mechanism so that when the engine is operating in the extremely low-load range, the intake maximum lift phase when the engine is cold is retarded more than that when the engine temperature is extremely low.

19. A method according to claim 18, further comprising controlling the phase control mechanism so that when the engine is operating in the extremely low-load range, the intake maximum lift phase after warm-up is advanced more than that when the engine is cold.

20. A method according to claim 19, further comprising controlling the operation angle control mechanism and the phase control mechanism so that when the engine temperature is extremely low and the engine is operating in the extremely low-load range, the intake operation angle is set at about 180° CA and the intake maximum lift phase is set at about 90° ATDC.

21. A method according to claim 19, further comprising controlling the operation angle control mechanism and the phase control mechanism so that when the engine is cold and is operating in the extremely low-load range, the intake operation angle is set at about 90° CA and the intake maximum lift phase is set at about 180° ATDC.

22. A method according to claim 19, further comprising, at acceleration, driving one of the operation angle control mechanism and the phase control mechanism by priority based on at least one of an engine speed and the engine temperature.

23. A method according to claim 22, further comprising, at acceleration from the extremely low-load range when the engine is cold, driving the phase control mechanism by priority.

24. A method according to claim 22, further comprising at acceleration from the extremely low-load range after warm-up, driving the operation angle control mechanism by priority.

25. A method according to claim 22, further comprising, at acceleration from the extremely low-load range when the engine is cold, driving the phase control mechanism by priority, and at acceleration from the extremely low-load range after warm-up, driving the operation angle control mechanism by priority.

26. A method according to claim 22, further comprising at acceleration from the extremely low-load range when the engine is cold, driving the phase control mechanism by priority if the engine is operating in an extremely low engine speed range.

27. A method according to claim 22, further comprising at acceleration from the extremely low-load range when the engine is cold, driving the operation angle control mechanism by priority if the engine is operating in a low-engine speed range.

28. A method according to claim 22, further comprising at acceleration from the extremely low-load range when the engine is cold, driving the phase control mechanism by priority if the engine is operating in an extremely low-engine speed range and driving the operation angle control mechanism by priority if the engine is operating in a low-engine speed range.

29. A method according to claim 17, further comprising controlling the operation angle control mechanism so that when the engine is operating in the extremely low-load range, the intake operation angle when the engine is cold is set smaller than that after warm-up.

* * * * *